J. D. SMITH.
CORN PLANTER.

No. 180,665.

Patented Aug. 1, 1876.

3 Sheets—Sheet 1.

WITNESSES

Wm A Skinkle
J. Stahl

By his Attorney

INVENTOR
Joseph D. Smith,
W D Baldwin

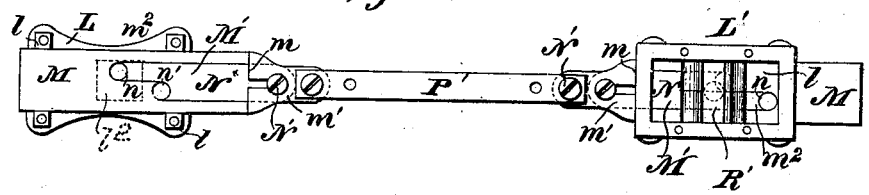
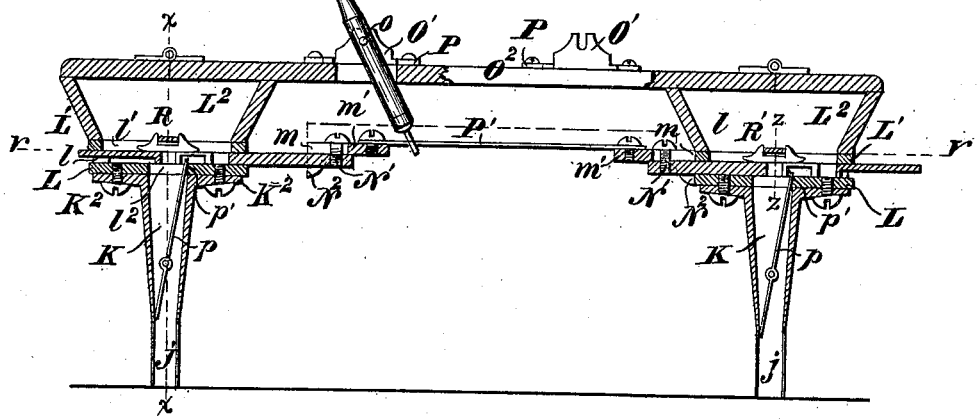
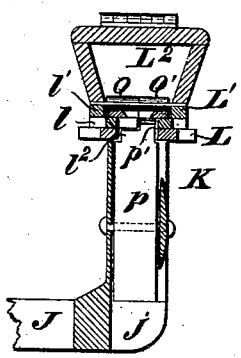
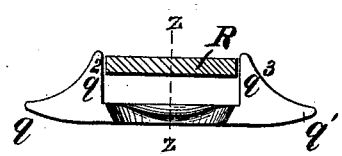
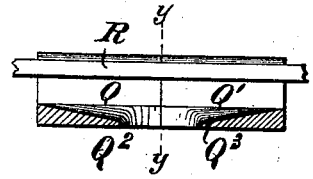

J. D. SMITH.
CORN PLANTER.

No. 180,665. Patented Aug. 1, 1876.

WITNESSES
Wm. A. Skinkle
F. Stich

INVENTOR
Joseph D. Smith.
By his Attorney
W. D. Baldwin

UNITED STATES PATENT OFFICE.

JOSEPH D. SMITH, OF ROCKFORD, ILLINOIS, ASSIGNOR OF ONE-HALF HIS RIGHT TO RALPH EMERSON AND WM. A. TALCOTT, OF SAME PLACE.

IMPROVEMENT IN CORN-PLANTERS.

Specification forming part of Letters Patent No. 180,665, dated August 1, 1876; application filed March 10, 1876.

*To all whom it may concern:*

Be it known that I, JOSEPH D. SMITH, of Rockford, in the county of Winnebago and State of Illinois, have invented certain new and useful Improvements in Corn-Planters, of which the following is a specification:

My improvements chiefly relate to a corn-planter of the class in which the seed carrying, regulating, and discharging devices are mounted upon a supplementary runner-frame in front of the main frame and supporting-wheels; and the objects of my invention are to increase the efficiency of the machine, and to place the various working parts thereof thoroughly under control.

The subject-matter claimed will hereinafter specifically be designated.

The accompanying drawings illustrate all my improvements as embodied in a single machine. Obviously, however, some of the improvements may be used without the others, and in machines differing somewhat in construction and operation from that herein shown.

Figure 1:
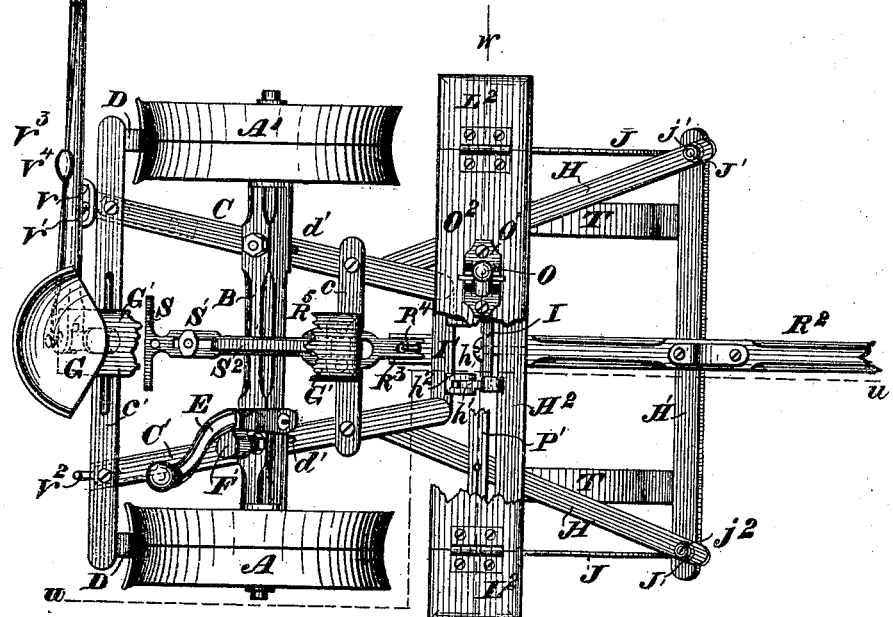
Figure 2:
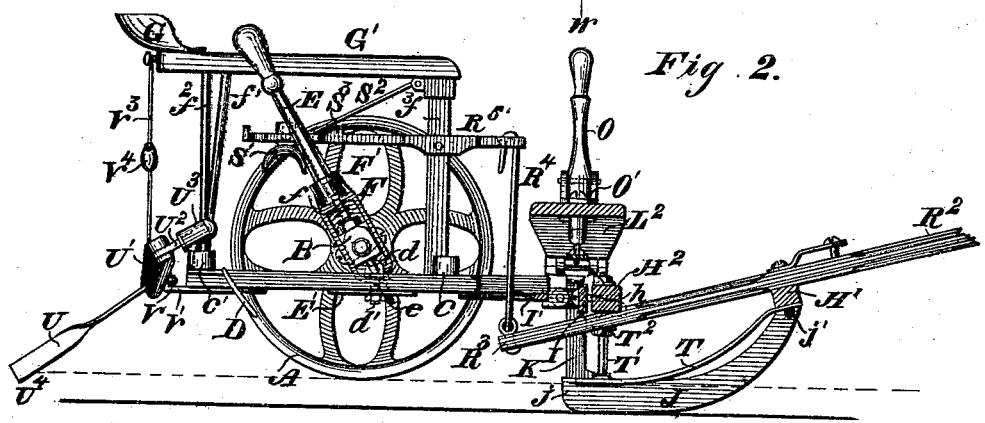
Figure 8:
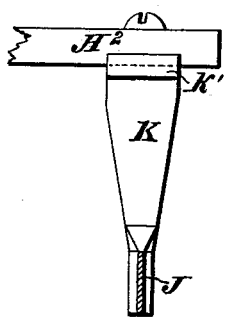
Figure 9:
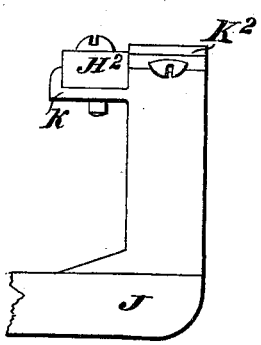
Figure 10:
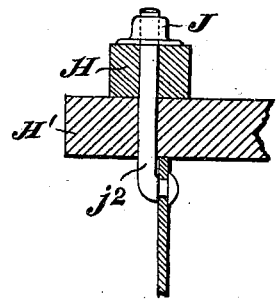
Figure 12:
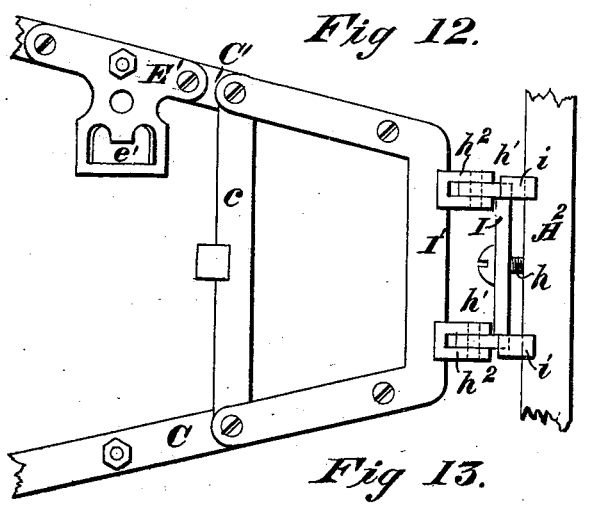
Figure 11:
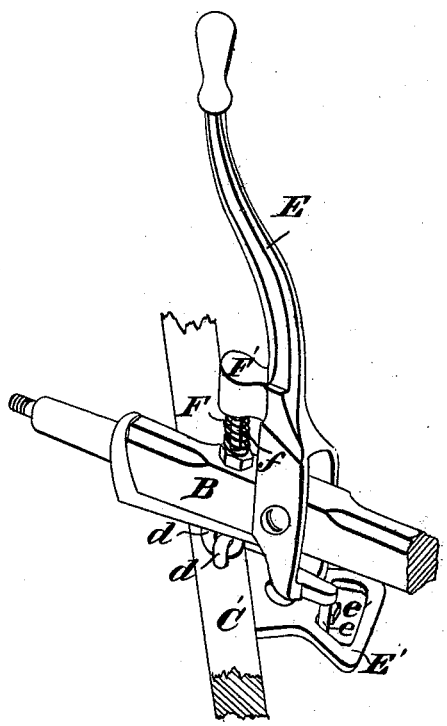
Figure 13:
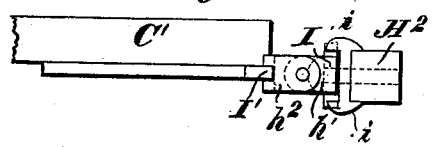

Figure 1 represents a plan or top view of my improved planter; Fig. 2, a vertical section of the same, on the line $u\,u$ of Fig. 1; Fig. 3, a horizontal section, in different planes, on the line $v\,v$ of Fig. 4, through the seed-distributing or regulating devices; Fig. 4, a vertical section on the line $w\,w$ of Fig. 1, showing the seed holding, regulating, and discharging apparatus; Fig. 5, a vertical section, on the line $x\,x$ of Fig. 4, showing one of the seed-discharge tubes and parts connected therewith; Fig. 6, an edge view of one of the sections of the gravity or self-acting cut-off, with its retainer or controlling-bar in section on the line $y\,y$ of Fig. 7, the edge of the cut-off section shown being that which abuts against the corresponding section when the two are in position; Fig. 7, a vertical section through one of the cut-offs, on the lines $z\,z$ and $z\,z$ of Figs. 4 and 6, the retainer or controlling-bar not being in section. Fig. 8 is a front elevation, and Fig. 9 a side elevation, of one of the seed-tubes, showing its connection with the frame; Fig. 10, a detail sectional view showing the connection of the frame-bars and front end of one of the runners; Fig. 11, a view in perspective, showing the connection between the supporting-axle and main frame and the lever for moving the axle backward and forward; Fig. 12, a view of a portion of the under side of the main frame, showing the hinge-connection between the main and supplementary frames; and Fig. 13, an edge view or side elevation of the hinge and its connections.

Supporting-wheels for the frame of the machine are, in this instance, formed double, or each composed of sections, and provided with concave peripheries or treads, two wheels, A A', being mounted loosely and independently upon suitable bearings at either end of an axle, B, the concavity in the tread being formed partly upon each section or wheel, as shown.

By this manner of constructing the wheels the sections are allowed independent movement, and clogging of the earth upon the wheels is prevented by the constant breaking of the arch of earth (which would form upon a single concave wheel) by the different motions of the wheel-sections.

The wheels and axle support a main frame of skeleton form, composed of two diagonal bars, C C', with front and rear cross bars or braces $c\,c'$. Fixed scrapers D D are carried by the main frame, and are shown herein as mounted on the projecting ends of the rear cross-bar $c'$. They serve to clear the wheels of any mud or clogging matter which may adhere to them.

The wheels are moved toward or away from the scrapers. To admit of this movement of the wheels the axle must be capable of a backward and forward movement independently of the frame, and be so connected with the frame as to be readily moved to bring the wheels to the scrapers when desired.

The frame is, in this instance, shown as supported beneath the axle, and connected therewith by means of joints formed by double eyebolts $d\,d'$, one of the eyebolts of each joint being upon the axle, and the other upon one of the diagonal beams or bars of the frame.

By this manner of connecting the axle with the frame the axle may be rocked back and forth to move the wheels up to or away from the scrapers by means of a lever, E, fulcrumed on the axle, and connected with the frame. This lever is shown as slotted, so as to embrace the axle to which it is jointed, in such manner as to move back and forth therewith, while having no movement transversely thereto independently thereof. The lever rocks parallel to the length of the axle, and carries at its lower end a clutch pin or arm, $e$, which moves in a slot, $e'$, in a detent or stop bracket, E′, secured to the main frame. Notches at the opposite ends of the way or slot $e'$ in the bracket, in which the end of the arm $e$ fits, serve to retain the axle and wheels in their forward or backward position, with the scrapers either out of operation or in working position.

The lever-clutch is caused automatically to engage with one or the other of the stops in the bracket-way by means of a spring, which tends always to cause the clutch to enter one of the stops when the lever is being operated. This spring F is shown, in this instance, as coiled around a stud, $f^3$, on the axle, formed by the prolongation of the shank of one of the eyebolts $d$, and as bearing at its lower end upon the nut which holds said bolt in place, while its upper end enters a cap or casing, F′, projecting from the lever.

The upper end of the lever E is provided with a handle within easy reach of the driver when upon a seat plank or beam, G′, or upon the seat G, which is secured upon the rear end of this seat plank or beam, which is supported at its front end by the front cross-bar $c$, and upheld and braced at its rear end by diagonal and upright rods $f^1$ $f^1$ $f^2$, secured at their lower ends to the rear cross-bar $c'$ of the main frame. The driver sits either in the seat G or upon the seat-beam G′, his position being governed by the amount of pressure desired upon the trenching-runners, hereinafter described.

A supplementary or runner frame, preferably constructed, as shown, of diagonal bars H H and front and rear cross-bars H¹ H², suitably united together, carries the seed-hoppers and the seed distributing and discharging apparatus. This frame is united to the main or supporting frame by means of a joint or hinge, which admits of its rocking or vibrating to a limited extent, both longitudinally and transversely, independently of the movements of the main frame. The joint is herein shown as composed of a rocking cross-head or plate, I, centrally pivoted, by a bolt, $h$, to the rear of the hind cross bar H² of the supplementary frame, and provided at its ends with lips or lugs $h^1$ $h^1$, pin-jointed in sockets $h^2$ $h^2$, projecting from a forked or angular metal plate, I′, crossing between the front ends of the diagonal bars C C′ of the main frame, and strongly secured to the under sides of said bars by means of its arms or forks.

The transverse rocking movement of the supplementary frame is limited by means of stops formed by the bent or flanged ends of plates $i\ i$, secured to the rear of the cross-bar H², one end of the rocking plate abutting against the upper flange of one stop, and its opposite end abutting against the lower flange of the other stop, when the frame rocks sidewise to the extent of the movement allowed it. The downward movement of the front end of the supplementary frame is limited by the contact of the rear ends of the diagonal bars H H as they move upward with the diagonal bars C C of the main frame. The upward movement of the front end of the supplementary frame, and consequent downward movement of the rear part thereof, independently of the main frame, is controlled in a manner hereinafter to be explained.

Runners J J, forked or provided with recesses or channels $j\ j$ at their rear ends, as usual, are connected at their opposite ends, respectively, with the front and rear cross-bars H¹ and H² of the supplementary or hinged frame. The upwardly-curved front ends of the runners are shown as united to the frame by means of down-hangers or hooks $j^1$ $j^2$, formed on the bolts which unite the front ends of the diagonal bars H H to the front cross-beam H¹, the bent ends of the bolts being inserted in holes in the runners and headed up or otherwise secured against withdrawal, and the nuts J′ J′, upon the threaded ends of the bolts, are then screwed tight against the diagonal bars, to unite these bars with the cross-bar, and secure the runners in place by drawing them up firmly against the under side of the beam.

The connections between the rear ends of the runners and rear cross-bar H² are made by means of seed-tubes K K, firmly secured to the runners at their lower ends, and secured to the bar by means of brackets $k\ k$, shown as formed with lips $k'\ k'$, to clamp the front of the bar H², to which the brackets are fastened by suitable screws or bolts.

The seed-tubes extend upward (closely fitting against the back of the bar H²) slightly above the top of this cross-bar, and are provided, at their upper ends, each with two horizontal bearings or supports, K′ K′, to which are suitably secured the centrally-slotted bottom plates L L of seed-slide guideways and hopper-supports. The upper parts L¹ L¹ of this guideway are separated from the bottom plates by studs or short uprights $l$ at the corners, through which pass screws for connecting the sections.

It is obvious that each guideway may be made in one piece, if desired. The upper plates or parts L¹ L¹ of the guideways support the hoppers L² L², which are fastened to them by screws, or in other suitable way. The upper plates L¹ L¹ are formed with their central portions open or slotted, to present openings $l^1$, corresponding to those in the bottoms of the hoppers, to allow the seed to rest upon the reciprocating seed-slide, the main portions or plates M M of which are formed of such a width and thickness as to work snugly and freely in the ways between the plates L L L¹ L¹ and their separating stud-posts, as is well understood. Each of these plates M is formed, near its inner end, with a shoulder, $m$, upon its upper side, and those portions $m^1 m^1$ of the plates extending horizontally from the shoulders $m$ $m$ to their inner ends are formed with their lower surfaces about in line with the upper surfaces of the main parts or bodies of the slide-plates, as shown.

Slots M' M' in the plates M M, each of a width at its widest part not exceeding the width of the openings $l^2$ in the bottom plates L L in the guideway over the seed-tubes, and preferably just corresponding in width with said openings, terminate at their outer ends in narrower slots $m^2 m^2$, of half the width of the main portions M' M' of the slots. The end of each of the narrow slots and the shoulder formed at its juncture with the main slot should be rounded, as shown. Regulating-slides N N, each of a form corresponding to that of the slots M' $m^2$, which also, by preference, have their ends $n$ $n$ and shoulders $n'$ $n'$ rounded, as shown, fit snugly in the slots, and are adjusted each by means of a single set-screw, N¹ N¹, at its inner end, passing through slots in the end portions $m^1 m^1$ of the slide-plates. By loosening the set-screws and moving the regulating-slides inward or outward the amount of seed or number of grains of corn discharged or dropped into the seed-tubes through the openings thus formed in the slide and the openings in the guideway-plates can quickly be regulated at will. The regulating-plates, it will be seen, are flush, or nearly so, both on their upper and under surfaces, with the corresponding surfaces of the seed-slide, and are therefore held securely in position against vertical displacement during the reciprocations of the seed-slide by the slide-guideways. Lugs N² N² on the under sides of the slide-plates, in connection with the shoulders $m$ $m$, form stops to limit the movement of the seed-slide, which is reciprocated by means of a lever, O, fulcrumed, by means of a pin, $o$, passing through it, in open bearings O¹ O¹ in either of the plates P, secured upon a beam or plank, O², forming a seat for the operator of the lever, which is connected at its lower end with a plate, P', connecting the two plates M M of the seed-slide, as shown.

The adjusting-slides N N, it will be observed, fit with their portions inside the hoppers wholly within the slots in the main slide-plates, thus presenting smooth regular upper and lower surfaces to work in the guideways and beneath the cut-offs, hereafter described, and project at their inner ends beneath the raised portions $m^1 m^1$ of the main slide-plates, in slots in which the set-screws are adjustable. (See Figs. 3 and 4.) As the upper surfaces of the ends of the slides N N, when secured by the set-screws, are drawn tightly against the under sides of the inner raised portions $m^1 m^1$ of the main slides, vertical movement of the adjusting-slides independently of the main slide-plates is prevented. This construction also admits of the adjusting-slides being entirely withdrawn by loosening the set-screws and drawing the slides inward. By detaching the connecting-bar P' from the main slide-plates they may be withdrawn from the hoppers, with the adjusting-slides in position, for inspection or repair, as well as to admit of the placing in position or removal of the cut-offs without removing their retaining-bars or controllers, if so desired.

The plank beam O² connects the two seed-hoppers, as usual.

The seed-tubes or conveyers K K are provided with the usual valves or pivoted separating-plates $p$ $p$, the upper end of each of which is shouldered, and formed with a spur or slight projection, $p'$, at one edge, entering a recess formed in the under side of the slide-plate M, at the side of the narrow portion of the slot therein, as shown. In this manner, while the plates $p$ $p$ are each vibrated as the seed-slide reciprocates to separate the seed discharged from one seed-cell from that discharged from the other, and hold it ready to be deposited at the next vibration of the plate, as is well understood, the shouldered portions of the plates work beneath the narrow portions or outer ends of the regulating-slides N N without interfering with their free movement and ready adjustment.

Self-acting cut-offs rest upon the reciprocating seed-slide in the bottoms of the hoppers, and depend simply upon their weight in cutting off the grain from the seed-cells. These cut-offs are sectional, being each made in two parts or sections, Q Q¹, with rounded ends $q$ $q$ $q^1$ $q^1$, and are centrally cut away, or provided with curved recesses Q² Q³, Figs. 6 and 7.

The cut-offs are plane-surfaced on the bottoms or under sides, between their upwardly-curved ends, and lie flat upon the ends M M of the seed-slide, while their upper sides are provided with shoulders or retaining-flanges $q^2$ $q^2$ $q^3$ $q^3$, from which shoulders the cut-offs curve downward to their ends, forming rounded points, as shown. Stationary bars R R¹, which should be so secured crosswise of the hopper-bottoms, or upon the top sections L' L' of the seed-slide guides and hopper-supports, as to be removable when it is desired to detach the cut-offs, prevent endwise or horizontal movement of the sectional cut-offs. These retaining-bars allow a limited upward movement to the cut-offs, to clear the seed-cells of superfluous grains when too full. The gravity of the cut-offs and weight of grain upon them return them to their normal positions after rising, while their rounded ends prevent the cutting or crushing of the grains. Each section of the cut-off rests upon the seed-slide, so as to act upon a single seed cell or cup, as shown, and the sections are self-adjusting and independent of each other in their action. The inoperative section of a cut-off is not disturbed by the movements of the parts in action. One section acts upon the inward movement of the seed-slide and the other upon its outward movement, to separate the seed in the seed-cell from the mass in the hopper.

It is obvious that where a slide having a single seed-cell is employed the cut-off would be made in one piece. To prevent accumulation of dirt or clogging substance upon the seed-slide, and between it and the cut-offs, the cut-offs are preferably made as shown in Figs. 6 and 7, with their top surfaces between their shoulders chamfered or cut out, to form thin edges at the walls or sides of the central openings formed by the recesses $Q^2$ $Q^3$. The cut-offs thus act as scrapers to loosen and remove any substance adhering to, or which otherwise might accumulate upon, the slide, which works up into the openings in the cut-offs, and is carried by them to the openings over the seed-tubes, and dropped into the tubes. A partition may be interposed between the cut-off sections to separate them, if desired, and may be either formed upon one or both of their adjacent edges, or be carried by the retainer-bars.

The draft-pole or tongue R is secured to the front and rear cross-bars $H^1$ $H^2$ of the supplementary or draft frame, being secured to the bar $H^2$ centrally beneath the hinge, uniting this frame to the main frame. The rearward extension of the tongue forms an arm, $R^3$, which is connected, by means of an eye and link, $R^4$, with the front end of a lever, $R^5$, pivoted so as to rock vertically upon the seat-standard $f$. The long end of this lever extends backward a suitable distance, and has a foot-rest, S, for the feet of the driver when in his seat. An adjustable stop, shown as formed by a thumb-screw, $S^1$, working in a longitudinal slot in the lever, and provided with a nut above the lever, serves, in connection with a pawl or detent-arm, $S^2$, to regulate the depth the runners of the supplementary frame cut into the ground. The pawl is pivoted in rear of the post $f^3$. A fixed stop, $S^3$, upon the lever, when engaged with the pawl, holds the supplementary frame - supporting runners clear of the ground. The driver, by bearing upon the foot-rest, may elevate the supplementary frame at any time desired, while leaving it free (so long as the rear ends of the diagonal bars H H thereof are not raised against the diagonal bars C C of the main frame) to vibrate transversely to a limited extent, to accommodate itself to inequalities of the surface over which the runners pass.

The depth to which the runners enter the soil may be regulated by means of broad-surfaced bearers or slides T T, which glide over the surface of the ground, parallel with but entirely disconnected from the runners J J. These bearers are connected (so as to be readily detachable from the supplementary frame) at their front ends with the front cross-bar $H^1$, and are connected at their rear ends with the rear cross-bar $H^2$ of the runner-frame by means of standards $T^1$ $T^1$, threaded at their upper ends, which pass through the cross-bar $H^2$, and are provided with nuts $T^2$ $T^2$, working on the top of the bar, for adjusting the height of the sliding bearers, which yield or give slightly at their front ends, to admit of their adjustment; or their adjustment may be provided for by not screwing tight the bolts connecting their front ends with the cross-bar $H^1$.

A marker, U, for indicating during each traverse of the field by the machine the next path to be followed by the machine, is connected with the main frame in such manner as to be under the control of the driver. The marker-carrier or supporting-arm $U^1$ is jointed at its inner end to the rear cross-bar $c'$ of the frame by a double joint composed of a diagonal or inclined short pin or bolt, $U^2$, turning in a socket, $U^3$, upon the bar $c'$, beneath the driver's seat, and projecting downwardly and rearwardly from this bar, being flattened at its outward end, and pin-jointed in a slot or cleft in the end of the carrier-arm, in such manner that this arm cannot be rocked transversely to the diagonal bolt independently thereof. The marker herein shown is formed of a bent or twisted plate, (see Figs. 1 and 2,) curved sidewise at its lower end to form a point, $U^4$, projecting on one side, to slightly turn the soil and form a plain mark or track. The marker is pivoted in a slot in the outer end of the arm $U^1$, in line with that in its inner end, and has no transverse movement or lateral motion independent of the arm. Instead of twisting the marker it may be jointed to the arm by a clevis. A staple-guide or controlling-loop, V, upon the carrier-arm, near its inner end, fits over one or the other of supporting-hooks or holders $V^1$ $V^2$, secured to the rear of the frame. The supporters prevent longitudinal swinging of the arm. A cord or other flexible connection, $V^3$, between the carrier-arm and driver's seat, enables the driver to lift the marker-arm from one holding-hook, and swing it around to be supported by the other at the end of the rows being planted. A hand piece or hold, $V^4$, to be grasped by the driver, may be secured upon the cord, as shown. By the peculiar formation of the marker, the manner in which it is jointed to the carrying-arm, and the diagonal double joint by which the carrying-arm is secured to the frame of the machine, the marker can be reversed or swung around from one side of the machine to the other. The turned end of the marker always projects outward or away from the machine, and the arm may be allowed, when not in use, to extend out in rear of the machine, the marker, in this position, extending out in line with the arm, with its turned end projecting upward, so as not to cut into the ground or catch in grass, weeds, &c. When in working position, the marker, as shown, extends rearwardly and downwardly from its arm at an angle thereto corresponding to that of the diagonal joint connecting the inner end of the arm with the frame of the machine.

From the foregoing description of my improved machine, its operation will readily be understood, and it will be seen that the grains of corn dropped through the seed-tubes and rear ends of the runners, in front of and about in line with the centers of the concave treads of the double wheels, are hilled over, or are covered by a ridge of earth formed by the soil being crowded or worked up toward the centers of the tracks made by the wheels, without liability of the wheels becoming clogged with earth. By means of the lifting-lever, the driver has complete control over the supplementary or hinged seeding-frame, and the broad-faced or sliding runners or bearers can be set to prevent the descent of the cutting or furrow-opening runners below any desired given point, thus preventing the furrowing or trench-opening runners from tilting downward at their rear ends, and cutting too deep by the raising of their front ends as the frame tilts.

I claim as of my own invention—

1. In a corn-planter, constructed substantially as hereinbefore set forth, the combination of a main frame mounted on sectional supporting-wheels provided with concave treads, formed partly in each section of either wheel, runners in advance of said wheels, and seed-tubes in line with the runners and wheels, whereby, in operation, the runners open trenches, in which the seed is dropped by the tubes, and the trenches are closed, and the seed covered by the wheels bearing the weight of the main frames without liability of their becoming clogged, as set forth.

2. The combination, substantially as hereinbefore set forth, of the frame of the machine, its axle, its supporting-wheels, scrapers carried by the frame, and a lever for moving the axle and wheels backward and forward independently of the frame, to bring the wheels up to or away from the stationary scrapers.

3. The combination of the main frame, the supplementary runner-frame, the hinge centrally connecting the adjacent ends of said frames, and allowing the runner-frame to rock both longitudinally and laterally, the tongue rigidly secured to the supplementary frame, and extending rearwardly therefrom parallel with and beneath the pivot upon which the hinge rocks transversely, and the lifting-lever linked at its front end to the tongue-extension, and provided with a rest for the driver's feet at its rear end, these members being constructed and operating substantially as and for the purposes set forth.

4. The combination of the main frame, the runner-frame hinged thereto, and capable of rocking both longitudinally and laterally independently thereof, the lifting-lever, its link, connection with the runner-frame, the stop adjustable back and forth upon the lever, and the pawl acting directly upon the stop, and swinging over and parallel with the lever, these members being constructed and operating substantially as and for the purposes set forth.

5. The combination of the supplementary frame, its trench-opening runners, and the hooked threaded bolts and their nuts, for connecting the diagonal bars and front cross-bar of the frame, and securing the front ends of the runners thereto, as set forth, whereby a single bolt and nut unites the front end of a diagonal bar to the cross-bar, and secures the front of the runner in place.

6. The combination, substantially as hereinbefore set forth, of the seed-slide plate, having a slot therein shouldered on one side, and terminating at one end in a narrow slot of half the width of the main portion of the slot, and the adjustable slide shaped to correspond with the slot in the seed-slide plate, fitting wholly therein within the hopper, and extending beneath the raised portion of the seed-slide plate outside the hopper, for the purpose specified.

7. A self-adjusting or gravity cut-off, constructed, substantially as hereinbefore set forth, with upwardly-turned rounded ends and a central opening, and adapted to rest directly upon the seed-slide, and be held down to its work simply by its own weight aided by the pressure of the grain.

8. The combination, substantially as hereinbefore set forth, of a self-adjusting cut-off, having turned-up ends and a central opening, shoulders on the upper surface thereof, and a retaining-bar crossing the hopper and fitting between the shoulders, to limit the upward movement of the cut-off and prevent longitudinal displacement.

9. The combination, substantially as hereinbefore set forth, of the self-adjusting cut-off, composed of independently-moving sections placed side by side, and held down to their work by gravity alone, their retainer, and the reciprocating seed-slide, having two seed-cells therein, one working beneath one section of the cut-off, and the other working beneath the other section of the cut-off, as set forth.

10. The marker, constructed, as hereinbefore set forth, of a twisted plate turned outward at its lower end to form the point $U^4$, with its edges at right angles to the edges of the opposite end, adapted to be pivoted to the carrying-arm, as set forth.

11. The combination, substantially as hereinbefore set forth, of the marker-carrying arm, the diagonal turning-bolt, to which it is pivoted at its inner end, and by which it is connected to the frame of the machine, and the marker, pivoted to the outer end of said arm by a pivot parallel, or nearly so, to that by which its inner end is jointed to the diagonal turning-bolt.

12. The combination of the swinging marker-arm, the diagonal double joint, by which it is connected to the frame of the machine, the holding-hooks on the frame, the loop on the arm, and the cord extending from the arm to the driver's seat, substantially as set forth.

In testimony whereof I have hereunto subscribed my name.

JOSEPH D. SMITH.

Witnesses:
A. R. ALBERTSON,
M. W. TROTT.